(12) United States Patent
Yang et al.

(10) Patent No.: US 11,035,751 B2
(45) Date of Patent: Jun. 15, 2021

(54) POSITIONING DEVICE FOR ARRANGEMENT OF BASIN FALSE BOTTOM IN OCEAN ENGINEERING

(71) Applicant: Shanghai Jiao Tong University, Shanghai (CN)

(72) Inventors: Jianmin Yang, Shanghai (CN); Xinliang Tian, Shanghai (CN); Xiaoxian Guo, Shanghai (CN); Longfei Xiao, Shanghai (CN); Tao Peng, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 282 days.

(21) Appl. No.: 15/541,100

(22) PCT Filed: Sep. 15, 2015

(86) PCT No.: PCT/CN2015/089627
§ 371 (c)(1),
(2) Date: Jun. 30, 2017

(87) PCT Pub. No.: WO2016/107213
PCT Pub. Date: Jul. 7, 2016

(65) Prior Publication Data
US 2017/0370801 A1 Dec. 28, 2017

(30) Foreign Application Priority Data

Dec. 31, 2014 (CN) .......................... 201410854968.0

(51) Int. Cl.
*G01M 10/00* (2006.01)
*G01B 11/00* (2006.01)
*G01S 17/87* (2020.01)

(52) U.S. Cl.
CPC ........... *G01M 10/00* (2013.01); *G01B 11/002* (2013.01); *G01S 17/87* (2013.01)

(58) Field of Classification Search
CPC ...... G01B 5/004; G01B 7/004; G01B 11/002; G01M 10/00
See application file for complete search history.

(56) References Cited

U.S. PATENT DOCUMENTS

| 4,142,258 A | 3/1979 | Schiron et al. |
| 7,441,340 B2 * | 10/2008 | Hertzman ............ G01C 15/002 33/290 |

(Continued)

FOREIGN PATENT DOCUMENTS

| CN | 1828254 A | 9/2006 |
| CN | 101308015 A | 11/2008 |

(Continued)

OTHER PUBLICATIONS

International Search Report, International Patent Application No. PCT/CN2015/089627, dated Nov. 13, 2015, 2 pages.

*Primary Examiner* — Erika J Villaluna
(74) *Attorney, Agent, or Firm* — Fitch, Even, Tabin & Flannery LLP

(57) ABSTRACT

A positioning device for arrangement of a basin false bottom in ocean engineering comprises a laser transmitting system, a rotating platform system, and a control and calculation system. The laser transmitting system comprises a laser transmitter used for providing laser beams. The rotating platform system comprises a two-degree-of-freedom rotating platform used for carrying the laser transmitter and making the laser beams have spatially arbitrary directivity. The control and calculation system is used for calculating, according to given coordinates, the angle by which the two-degree-of-freedom rotating platform needs to rotate, controlling rotation of the two-degree-of-freedom rotating (Continued)

platform, and making the laser beams transmitted by the laser transmitter accurately indicate the given coordinates at the basin false bottom. Compared with an existing manual positioning method for a false bottom, the positioning device is high in accuracy, easy to operate, and rapid, and saves labor and greatly improves the test efficiency.

6 Claims, 2 Drawing Sheets

(56) References Cited

U.S. PATENT DOCUMENTS

| 8,031,332 B2* | 10/2011 | Miller | G01C 15/002 |
| | | | 356/4.01 |
| 2014/0123508 A1* | 5/2014 | Graesser | G01C 15/002 |
| | | | 33/228 |

FOREIGN PATENT DOCUMENTS

| CN | 101710022 A | 5/2010 |
| CN | 101750012 A | 6/2010 |
| CN | 102323031 A | 1/2012 |
| CN | 203224347 U | 10/2013 |
| CN | 104075658 A | 10/2014 |
| CN | 104535291 A | 4/2015 |
| JP | H0634485 A | 2/1994 |
| JP | 2010054429 A | 3/2010 |

\* cited by examiner

POSITIONING DEVICE FOR ARRANGEMENT OF BASIN FALSE BOTTOM IN OCEAN ENGINEERING

CROSS-REFERENCE TO RELATED APPLICATIONS

This application is a U.S. national phase application filed under 35 U.S.C. § 371 of International Application No. PCT/CN2015/089627, filed Sep. 15, 2015, designating the United States and claiming priority to Chinese Patent Application No. 201410854968.0, filed Dec. 31, 2014.

FIELD OF THE INVENTION

The present invention relates to a positioning device for use in the technical field of ocean engineering, and in particular to a positioning device for arrangement of a basin false bottom in ocean engineering.

DESCRIPTION OF THE PRIOR ART

Ocean engineering basin is important equipment in ocean engineering research, which mainly bears the task of model test for ocean structures, playing an important role in the researches in the field of ocean engineering. In order to simulate the ocean environments with different water depths, the ocean engineering basin will usually be installed with a large area false bottom which can be lifted and lowered as a whole. By lifting and lowering the false bottom, the different test water depths can be adjusted so as to simulate the ocean environment with different water depths.

In the model test, the false bottom is used to simulate the seafloor in the real ocean environment. In the actual ocean operation and production activities, most of the ocean structures are positioned by an anchoring system, one end of the anchor chain thereof is fixed to the ocean structures, and the other end of the anchor chain thereof is fixed to the seafloor. In the model test, the coordinates of the anchor chain at the false bottom will be calculated based on the test scale relation, and the corresponding point will be found at the false bottom as the seafloor anchoring point of the anchoring system for the model test.

In the preparation phase of the model test, it is necessary to find the anchoring point of each anchor chain at the false bottom, and mark well to facilitate the arrangements of the anchor chains at the time of the test. The existing positioning method is usually raising the false bottom above the surface of the water first, and then scaling, drawing lines, positioning, finding the anchoring points and making the corresponding marks at the false bottom. Although this method is simple and intuitive, the operation is very cumbersome, 3-4 people are usually required to operate at the false bottom, the efficiency is low, and its accuracy is also low.

SUMMARY OF THE INVENTION

In view of the above-mentioned drawbacks of the prior art, the technical problem to be solved by the present invention is to provide a positioning device for arrangement of a basin false bottom in ocean engineering which has simple structures, is quick to operate, has high positioning accuracy, high operating efficiency and is stable to operate.

In order to achieve the above-mentioned object, the present invention provides a positioning device for arrangement of a basin false bottom in ocean engineering, including:

a laser transmitting system including a laser transmitter used for providing laser beams;

a rotating platform system including a two-degree-of-freedom rotating platform used for carrying the laser transmitter and making the laser beams have spatially arbitrary directivity;

a control and calculation system used for calculating, according to given coordinates, the angle by which the two-degree-of-freedom rotating platform needs to rotate, controlling the rotation of the two-degree-of-freedom rotating platform and making the laser beams transmitted by the laser transmitter accurately indicate the given coordinates at the basin false bottom.

Further, the laser transmitting system also includes a laser controller provided inside the laser transmitter for controlling the switching of the laser transmitter and the intensity of the laser beams.

Further, the two-degree-of-freedom rotating platform includes a first rotating motor and a second rotating motor, the rotating shaft of the first rotating motor and the rotating shaft of the second rotating motor are perpendicular to each other, and the first rotating motor and the second rotating motor can rotate 360° along the respective corresponding rotating shaft, respectively.

Further, the rotating platform system further includes an angular position sensor provided inside the two-degree-of-freedom rotating platform; the angular position sensor can accurately measure the real-time rotational positions of the first rotating motor and the second rotating motor, and transmit the rotational positions to the control and calculation system.

Further, the control and calculation system includes a control terminal, a computer and a control solution software; the control terminal is used for controlling the computer to run the control solution software; the control solution software possesses functions that include parameter verification and calibration, parameter input and solution, laser source control, and rotating platform motor control.

Further, the parameter verification and calibration refers to the control solution software solving the coordinates and attitude parameters of the two-degree-of-freedom rotating platform with the known coordinates and the corresponding rotation angles of the motors by calibrating the known coordinates at the basin false bottom.

Further, the parameter input and solution refers to the control solution software capable of automatically solving the corresponding angles by which the first rotating motor and the second rotating motor need to rotate, after the coordinates required to be indicated at the basin false bottom is input manually.

Further, the laser source control refers to the control solution software remotely controlling on and off of the laser transmitter manually or automatically.

Further, the rotating platform motor control refers to the control solution software capable of controlling the first rotating motor and the second rotating motor to arrive any azimuth angle manually or automatically.

Further, the laser transmitter has the characteristics of high accuracy, good collimation and remote control, and the laser energy transmitted by the laser transmitter is kept within the range that the person can safely contact, and is harmless to the human body.

Further, the first rotating motor and the second rotating motor both have the characteristics of large rotational range, high control accuracy and small step size, and have a certain dustproof and moistureproof performance, and are suitable for the special operating environment of the ocean engineering basins.

The present invention also provides a method for positioning a basin false bottom in ocean engineering with any of the positioning devices described above, including the following steps:

a first step of fixing the rotating platform system to a fixed position on the top of the basin false bottom and ensuring that the first rotating motor in the two-degree-of-freedom rotating platform is in a horizontal position, so that the laser beams transmitted by the laser transmitter can cover all areas of the basin false bottom without obstructions;

a second step of providing the control and calculation system beside the basin false bottom, controlling rotation of the two-degree-of-freedom rotating platform with the control and calculation system, making the laser beams transmitted by the laser transmitter align with the known fixed reference point of the basin false bottom, running the calibration program, and solving the coordinates and attitude parameters of the two-degree-of-freedom rotating platform itself; and a third step of inputting the coordinates required to be indicated, the control and calculation system calculating, according to given coordinates, the angle by which the two-degree-of-freedom rotation platform needs to be rotate, controlling rotation of the two-degree-of-freedom rotating platform, and making the laser beams transmitted by the laser transmitter accurately indicate the false bottom position corresponding to the given coordinates, thereby completing the work of false bottom positioning.

The beneficial effects of the present invention are:

The positioning device for arrangement of a basin false bottom in ocean engineering according to the present invention is driven by two continuously variable motors based on the characteristics of linear propagation of lasers and the like, can accurately indicate the positions with any coordinates at the false bottom, and has advantages of clear positioning, explicit functions, and easy to implement the structures. Compared with an existing manual positioning method for a false bottom, the present positioning device is high in accuracy, easy to operate, and rapid, and saves labor and greatly improves the test efficiency. Compared with the GPS positioning devices applied in other areas, the positioning device has advantages of simple structure, strong practicality, low cost, and high accuracy.

The concepts, the specific structures and the technical effects of the present invention will be described further below in conjunction with the accompanying drawings, in order to fully understand the objects, features and effects of the present invention.

DETAILED DESCRIPTION OF THE PREFERRED EMBODIMENTS

Figure 1:
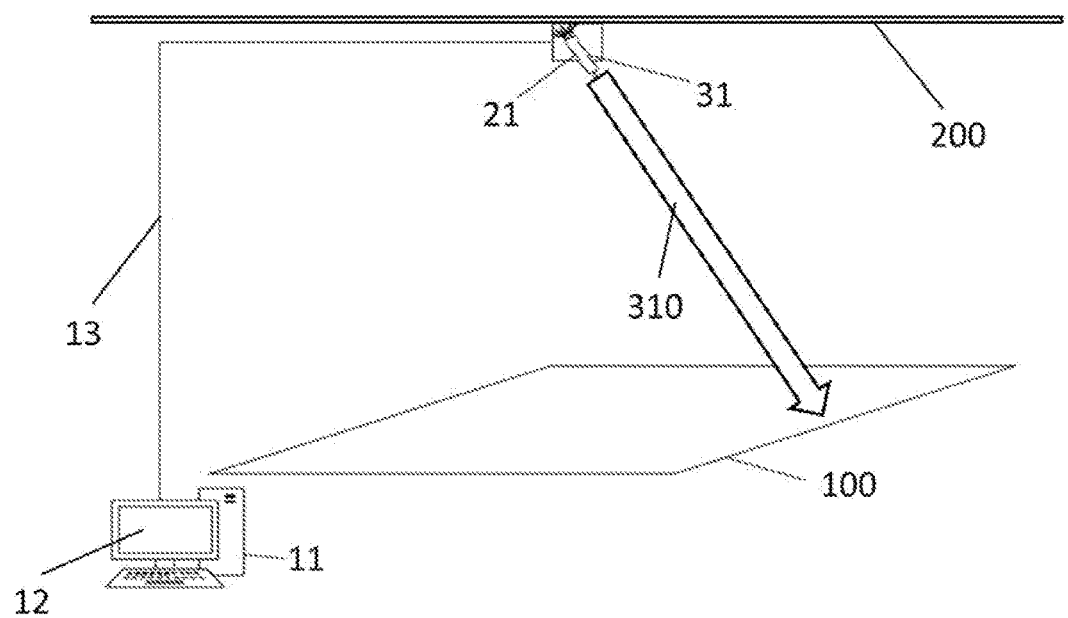
FIG. 1 is a schematic structural diagram of a positioning device for arrangement of a basin false bottom in ocean engineering according to a preferred embodiment of the present invention.

As shown in FIG. 1, a preferred embodiment of the present invention provides a positioning device for arrangement of a basin false bottom in ocean engineering, the structure of which includes a laser transmitting system, a rotating platform system, and a control and calculation system, wherein the control and calculation system is provided beside the basin false bottom 100, and includes a control terminal 11, a computer 12 and a control solution software. The control terminal 11 is used for controlling the computer 12 to run the control solution software.

The rotating platform system is connected to the control terminal 11 via a network cable 13, and the rotating platform system includes a two-degree-of-freedom rotating platform 21 and an angular position sensor. The two-degree-of-freedom rotating platform 21 is provided on the top of the basin false bottom 100, for example, in the present embodiment, the two-degree-of-freedom rotating platform 21 is fixed to the roof 200 on the top of the basin false bottom 100. The two-degree-of-freedom rotating platform 21 includes a first rotating motor 211 and a second rotating motor 212, the rotating shaft of the first rotating motor 211 and the rotating shaft of the second rotating motor 212 are perpendicular to each other, and the first rotating motor 211 and the second rotating motor 212 can rotate 360° along the respective corresponding rotating shaft, respectively. The first rotating motor 211 and the second rotating motor 212 according to the present embodiment both have the characteristics of large rotational range, high control accuracy and small step size, and meanwhile have a certain dustproof and moistureproof performance, being suitable for the special operating environment of the ocean engineering basins. The angular position sensor in the rotating platform system is provided inside the two-degree-of-freedom rotating platform 21, can accurately measure the real-time rotational positions of the first rotating motor 211 and the second rotating motor 212, and transmit the rotational positions to the control and calculation system.

Figure 2:
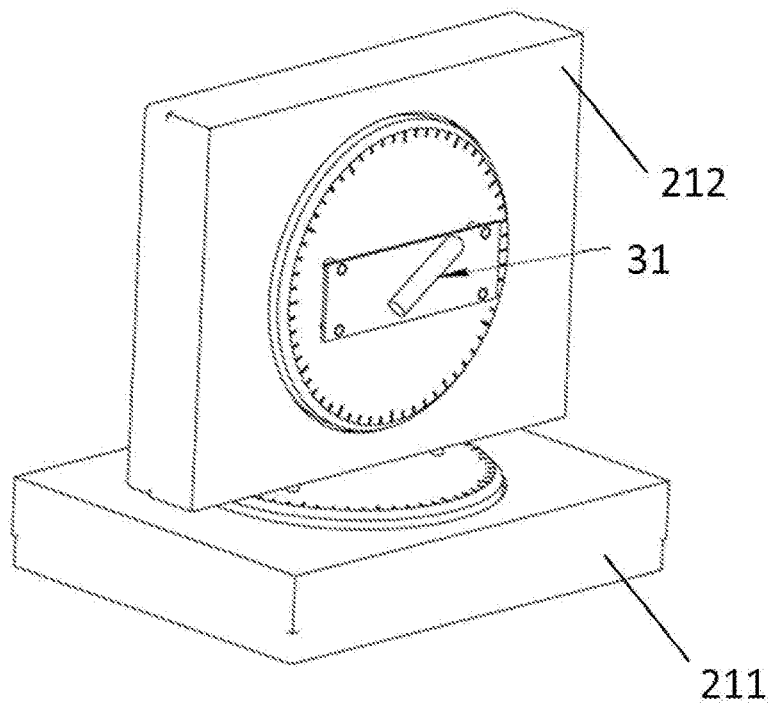
FIG. 2 is a schematic structural diagram of a two-degree-of-freedom rotating platform according to a preferred embodiment of the present invention.

The laser transmitting system includes a laser transmitter 31 and a laser controller, the laser transmitter 31 is carried on the two-degree-of-freedom rotating platform 21, specifically, fixed to the second rotating motor 212, as shown in FIG. 2. The laser transmitter 31, as a laser source, is used for providing laser beams 310. In the present embodiment, the platform on which the first rotating motor 211 is located is in a horizontal position so that the laser beams 310 transmitted by the laser transmitter 31 can cover all areas of the basin false bottom 100 without obstructions. Since the first rotating motor 211 and the second rotating motor 212 can rotate 360° along the respective corresponding rotating shaft, respectively, the laser beams 310 transmitted by the laser transmitter 31 has spatially arbitrary directivity. The laser transmitter 31 according to the present embodiment has the characteristics of high accuracy, good collimation and remote control, and the laser energy transmitted by the laser transmitter 31 is kept within the range that the person can safely contact, and is harmless to the human body. The laser controller in the laser transmitting system is provided inside the laser transmitter 31 for controlling the switching of the laser transmitter 31 and the intensity of the laser beams, and the laser controller is connected to the laser transmitter 31 via a network cable, and also can remotely control the laser transmitter.

The control and calculation system according to the present embodiment is used for calculating, according to given coordinates, the angle by which the two-degree-of-freedom rotating platform 21 needs to rotate, controlling rotation of the two-degree-of-freedom rotating platform 21, and making the laser beams transmitted by the laser transmitter 31 accurately indicate the given coordinates at the basin false bottom 100. The control solution software in the control and calculation system possesses functions that include parameter verification and calibration, parameter input and solution, laser source control, and rotating platform motor control.

The parameter verification and calibration refers to the control solution software solving the coordinates and attitude parameters of the two degree-of-freedom rotating platform 21 with the known coordinates and the corresponding rotation angles of the motors by calibrating the known coordinates at the basin false bottom. The parameter input and solution refers to the control solution software capable of automatically solving the corresponding angles by which the first rotating motor 211 and the second rotating motor 212 need to rotate, after the coordinates required to be indicated at the basin false bottom is input manually. The laser source control refers to the control solution software remotely controlling on and off of the laser transmitter 31 manually or automatically. The rotating platform motor control refers to the control solution software capable of controlling the first rotating motor 211 and the second rotating motor 212 to arrive any azimuth angle manually or automatically.

The working process of the positioning device for arrangement of a basin false bottom in ocean engineering according to the present embodiment is as follows:

first step: controlling rotation of the two-degree-of-freedom rotating platform 21 with the control and calculation system, making the laser beams 310 transmitted by the laser transmitter 31 align with the known fixed reference point of the basin false bottom 100, running the calibration program, and solving the coordinates and attitude parameters of the two-degree-of-freedom rotating platform 21 itself; and second step: inputting the coordinates required to be indicated, the control and calculation system calculating, according to given coordinates, the angle by which the two-degree-of-freedom rotating platform 21 needs to rotate, controlling rotation of the two-degree-of-freedom rotating platform 21, and making the laser beams 310 transmitted by the laser transmitter 31 accurately indicate the false bottom position corresponding to the given coordinates, thereby completing the work of the false bottom positioning.

Figure 3:
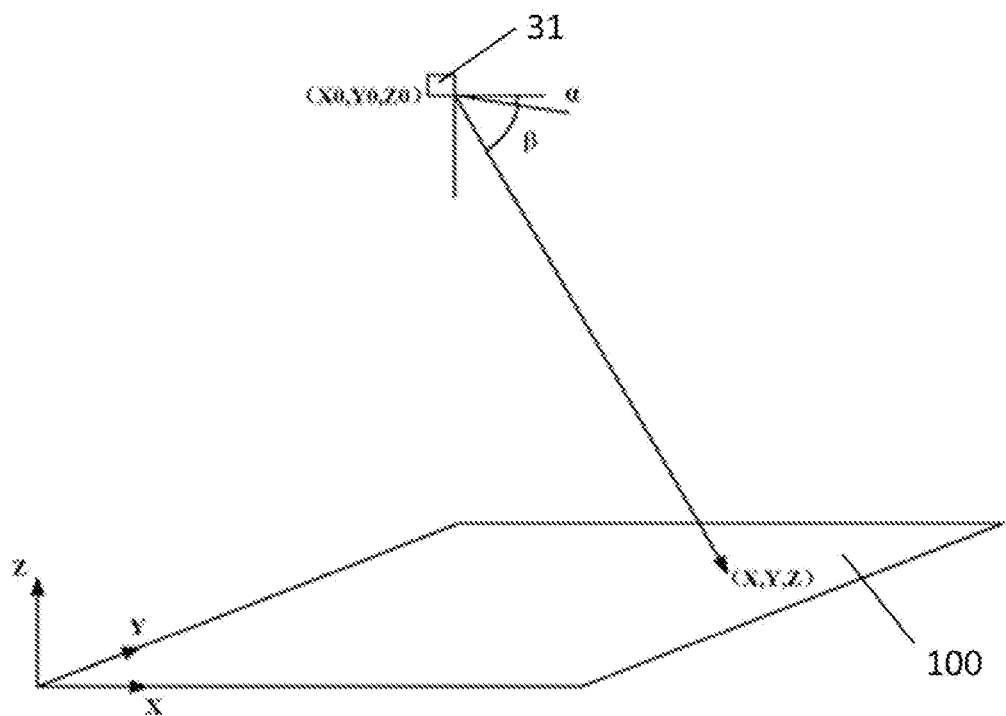
FIG. 3 is a schematic diagram of the algorithm principle according to a preferred embodiment of the present invention.

The algorithm principle of the control solution software according to the present embodiment is shown in FIG. 3, the required rotation angles ($\alpha$, $\beta$) of the two motors (i.e., the first motor 211 and the second motor 212) can be solved based on the given coordinates (X, Y, Z) at the basin false bottom and the position coordinates (X0, Y0, Z0) of the laser transmitter 31; and meanwhile, the position coordinates (X0, Y0, Z0) of the laser transmitter 31 can be obtained by aiming the given basin point coordinates (X, Y, Z), the known rotation angles ($\alpha$, $\beta$) of the motors, and the position height H of the rotating platform.

The absolute coordinate system of the basin false bottom is XYZ, and the local coordinate system of the two-degree-of-freedom rotating platform 21 is $\overline{xyz}$, the coordinate position in the absolute coordinate system is (X0, Y0, Z0), and the rotation angles are ($\alpha'$, $\beta'$, $\gamma'$).

After adjustment at the time of installation, it can ensure that the included angles $\alpha'$, $\beta'$, $\gamma'$ between the two coordinate systems all are small angles, and the two coordinate systems meet the conversion relationship:

$$\begin{pmatrix} \overline{x} \\ \overline{y} \\ \overline{z} \end{pmatrix} = \begin{pmatrix} 1 & -\gamma' & \beta' \\ \gamma' & 1 & \alpha' \\ \beta' & \alpha' & 1 \end{pmatrix} \begin{pmatrix} X \\ Y \\ Z \end{pmatrix} + \begin{pmatrix} X0 \\ Y0 \\ Z0 \end{pmatrix}$$

The point coordinate (X, Y, Z) in the absolute coordinate system of the false bottom is carried over to the relative coordinate system of the two-degree-of-freedom rotating platform 21, which is the point ($\overline{x}$, $\overline{y}$, $\overline{z}$). In the relative coordinate system, it meets the relationship as follows:

$$\tan\alpha = \frac{|\overline{y}|}{|\overline{x}|}$$

$$\tan\beta = \frac{|\overline{z}|}{\sqrt{\overline{x}^2 + \overline{y}^2}}$$

(1) Given the position coordinates (X, Y, Z), and the rotation angles ($\alpha$, $\beta$) of the two motors and the position height H of the two-degree-of-freedom rotating platform 21 are known, the position coordinates (X0, Y0, Z0) of the laser transmitter 31 are solved:

$$\begin{pmatrix} X0 \\ Y0 \\ Z0 \end{pmatrix} = \frac{H}{\tan\beta} = \begin{matrix} \cos\alpha \\ \sin\alpha \\ \tan\beta \end{matrix} - \begin{pmatrix} 1 & -\gamma' & \beta' \\ \gamma' & 1 & \alpha' \\ \beta' & \alpha' & 1 \end{pmatrix} \begin{pmatrix} X \\ Y \\ Z \end{pmatrix}$$

(2) Given the coordinates (X, Y, Z), and the position coordinates (X0, Y0, Z0) of the laser transmitter 31 is known, the rotation angles ($\alpha$, $\beta$) of the two motors are solved:

$$\begin{pmatrix} \overline{x} \\ \overline{y} \\ \overline{z} \end{pmatrix} = \begin{pmatrix} 1 & -\gamma' & \beta' \\ \gamma' & 1 & \alpha' \\ \beta' & \alpha' & 1 \end{pmatrix} \begin{pmatrix} X \\ Y \\ Z \end{pmatrix} + \begin{pmatrix} X0 \\ Y0 \\ Z0 \end{pmatrix}$$

$$\alpha = \tan^{-1} \frac{|\overline{y}|}{|\overline{x}|} + \alpha_0$$

$$\beta = \tan^{-1} \frac{|\overline{z}|}{\sqrt{\overline{x}^2 + \overline{y}^2}} + \beta_0$$

wherein $\alpha_0$, $\beta_0$ are initial rotation angles of the motors.

The preferred specific embodiments of the present invention have been described in detail above. It is to be understood that numerous modifications and variations can be made by those ordinary skilled in the art in accordance with the concepts of the present invention without any inventive effort. Hence, the technical solutions that can be derived by those skilled in the art according to the concepts of the present invention on the basis of the prior art through logical analysis, reasoning and limited experiments should be within the scope of protection defined by the claims.

The invention claimed is:

1. A positioning device for arrangement of a basin false bottom in ocean engineering, comprising:
    a laser transmitting system comprising a laser transmitter used for providing laser beams;
    a rotating platform system comprising a two-degree-of-freedom rotating platform used for carrying the laser transmitter and making the laser beams have spatially arbitrary directivity; and
    a control and calculation system used for calculating, according to given coordinates in an absolute coordinate system of the basin false bottom, the angle by which the two-degree-of-freedom rotating platform needs to rotate, controlling rotation of the two-degreeof-freedom rotating platform, and making the laser beams transmitted by the laser transmitter accurately indicate the given coordinates at the basin false bottom;

wherein the basin false bottom has a first coordinate system XYZ, and the two-degree-of-freedom rotating platform has a second coordinate system X' Y' Z', and the first coordinate system XYZ and the second coordinate system X' Y' Z' meet a conversion relationship:

$$\begin{bmatrix} X' \\ Y' \\ Z' \end{bmatrix} = \begin{bmatrix} 1 & -\gamma' & \beta' \\ \gamma' & 1 & \alpha' \\ \beta' & \alpha' & 1 \end{bmatrix} \begin{bmatrix} X \\ Y \\ Z \end{bmatrix} + \begin{bmatrix} X_0 \\ Y_0 \\ Z_0 \end{bmatrix}$$

wherein $\alpha'$, $\beta'$, $\gamma'$ represent rotation angles between the first coordinate system XYZ and the second coordinate system X' Y' Z', and $X_0$, $Y_0$, $Z_0$ represent coordinates of the two-degree-of-freedom rotating platform in the first coordinate system XYZ;

wherein the control and calculation system comprises a control terminal, a computer and a control solution software; the control terminal is used for controlling the computer to run the control solution software; the control solution software possesses functions that include parameter verification and calibration, parameter input and solution, laser source control, and rotating platform motor control;

wherein the two-degree-of-freedom rotating platform comprises a first rotating motor and a second rotating motor, the rotating shaft of the first rotating motor and the rotating shaft of the second rotating motor are perpendicular to each other, and the first rotating motor and the second rotating motor can rotate 360° along the respective corresponding rotating shaft, respectively;

wherein the rotating platform system further comprises an angular position sensor provided inside the two-degree-of-freedom rotating platform, the angular position sensor capable of accurately measuring a real-time rotational angle of the first rotating motor and the second rotating motor, and transmitting the rotational angle to the control and calculation system;

wherein the parameter verification and calibration refers to that the control solution software calibrates known coordinates in the absolute coordinate system of the basin false bottom, and solves coordinates and attitude parameters of the two-degree-of-freedom rotating platform using the known coordinates and the corresponding rotation angles of the motors, wherein the coordinates of the two-degree-of-freedom platform refer to coordinates of the two-degree-of-freedom platform in the absolute coordinate system of the basin false bottom.

2. The positioning device according to claim 1, wherein the laser transmitting system further comprises a laser controller provided inside the laser transmitter for controlling the switching of the laser transmitter and the intensity of the laser beams.

3. The positioning device according to claim 1, wherein the parameter input and solution refers to the control solution software capable of automatically solving the corresponding angles by which the first rotating motor and the second rotating motor need to rotate, after the given coordinates required to be indicated at the basin false bottom are inputted manually.

4. The positioning device according to claim 1, wherein the laser source control refers to the control solution software remotely controlling on and off of the laser transmitter manually or automatically.

5. The positioning device according to claim 1, wherein the rotating platform motor control refers to the control solution software capable of controlling the first rotating motor and the second rotating motor to arrive any azimuth angle manually or automatically.

6. A method for positioning a basin false bottom in ocean engineering with a positioning device comprising:
a laser transmitting system comprising a laser transmitter used for providing laser beams;
a rotating platform system comprising a two-degree-of-freedom rotating platform used for carrying the laser transmitter and making the laser beams have spatially arbitrary directivity; and
a control and calculation system used for calculating, according to given coordinates in an absolute coordinate system of the basin false bottom, the angle by which the two-degree-of-freedom rotating platform needs to rotate, controlling rotation of the two-degree-of-freedom rotating platform, and making the laser beams transmitted by the laser transmitter accurately indicate the given coordinates at the basin false bottom;
wherein the basin false bottom has a first coordinate system XYZ, and the two-degree-of-freedom rotating platform has a second coordinate system X' Y' Z', and the first coordinate system XYZ and the second coordinate system X' Y' Z' meet a conversion relationship:

$$\begin{bmatrix} X' \\ Y' \\ Z' \end{bmatrix} = \begin{bmatrix} 1 & -\gamma' & \beta' \\ \gamma' & 1 & \alpha' \\ \beta' & \alpha' & 1 \end{bmatrix} \begin{bmatrix} X \\ Y \\ Z \end{bmatrix} + \begin{bmatrix} X_0 \\ Y_0 \\ Z_0 \end{bmatrix}$$

wherein $\alpha'$, $\beta'$, $\gamma'$ represent rotation angles between the first coordinate system XYZ and the second coordinate system X' Y' Z', and $X_0$, $Y_0$, $Z_0$ represent coordinates of the two-degree-of-freedom rotating platform in the first coordinate system XYZ;
wherein the two-degree-of-freedom rotating platform comprises a first rotating motor and a second rotating motor, the rotating shaft of the first rotating motor and the rotating shaft of the second rotating motor are perpendicular to each other, and the first rotating motor and the second rotating motor can rotate 360° along the respective corresponding rotating shaft, respectively;
wherein the rotating platform system further comprises an angular position sensor provided inside the two-degree-of-freedom rotating platform, the angular position sensor capable of accurately measuring a real-time rotational angle of the first rotating motor and the second rotating motor, and transmitting the rotational angle to the control and calculation system;
the method comprising the following steps:
first step: fixing the rotating platform system to a fixed position on the top of the basin false bottom so that the laser beams transmitted by the laser transmitter can cover all areas of the basin false bottom without obstructions;
second step: controlling rotation of the two-degree-of-freedom rotating platform with the control and calculation system, making the laser beams transmitted by the laser transmitter align with a reference point of the basin false bottom having known coordinates in the absolute coordinate system of the basin false bottom, running a calibration program, calibrating the known coordinates and solving the coordinates and attitude parameters of the two-degree-of-freedom rotating platform, wherein the coordinates of the two-degree-of-freedom platform refer to coordinates of the two-degree-of-freedom platform in the absolute coordinate system of the basin false bottom; and third step: inputting the given coordinates required to be indicated, the control and calculation system calculating, according to the given coordinates, the angle by which the two-degree-of-freedom rotating platform needs to rotate, controlling rotation of the two-degree-of-freedom rotating platform, and making the laser beams transmitted by the laser transmitter accurately indicate the false bottom position corresponding to the given coordinates, thereby completing the work of false bottom positioning.

\* \* \* \* \*